(12) United States Patent
Mehrl

(10) Patent No.: US 10,859,433 B2
(45) Date of Patent: Dec. 8, 2020

(54) CALIBRATION ARRANGEMENT, OPTICAL SENSOR ARRANGEMENT, AND METHOD FOR ASSEMBLY LINE IN-SITU CALIBRATION OF AN OPTICAL DEVICE COMPRISING AN OPTICAL SENSOR

(71) Applicant: ams AG, Unterpremstaetten (AT)

(72) Inventor: David Mehrl, Plano, TX (US)

(73) Assignee: AMS AG, Unterpremstaetten (AT)

( * ) Notice: Subject to any disclaimer, the term of this patent is extended or adjusted under 35 U.S.C. 154(b) by 124 days.

(21) Appl. No.: 15/767,971

(22) PCT Filed: Oct. 13, 2016

(86) PCT No.: PCT/EP2016/074581
§ 371 (c)(1),
(2) Date: Apr. 12, 2018

(87) PCT Pub. No.: WO2017/064181
PCT Pub. Date: Apr. 20, 2017

(65) Prior Publication Data
US 2018/0306639 A1     Oct. 25, 2018

Related U.S. Application Data

(60) Provisional application No. 62/241,452, filed on Oct. 14, 2015.

(30) Foreign Application Priority Data

Dec. 2, 2015   (EP) ..................................... 15197602

(51) Int. Cl.
*G01J 1/08*        (2006.01)
*G01J 1/42*        (2006.01)
*G09G 3/34*        (2006.01)

(52) U.S. Cl.
CPC ............... *G01J 1/08* (2013.01); *G01J 1/4204* (2013.01); *G09G 3/3406* (2013.01);
(Continued)

(58) Field of Classification Search
CPC ...... G01J 1/08; G01J 1/4204; G01J 2001/083; G09G 3/3406; G09G 2320/0693; G09G 2360/144
See application file for complete search history.

(56) References Cited

U.S. PATENT DOCUMENTS

| 5,048,335 A * | 9/1991 | Marsh | G01F 23/265 324/601 |
| 2010/0163717 A1* | 7/2010 | Chang | G01D 18/008 250/252.1 |
| 2015/0338271 A1* | 11/2015 | Aubert | G01J 1/08 250/208.2 |

FOREIGN PATENT DOCUMENTS

WO       2014/102629 A1    7/2014

* cited by examiner

*Primary Examiner* — Jamil Ahmed
(74) *Attorney, Agent, or Firm* — MH2 Technology Law Group LLP

(57) ABSTRACT

An assembly line in-situ calibration arrangement, optical sensor arrangement and a method for calibration of an optical sensor arrangement are presented. A calibration arrangement comprises a calibration head comprising at least one calibrated light source located behind an aperture in a housing and being electrically connected to a power terminal. A power source is connected to the power terminal, the power source comprising a switching unit electrically connected to the at least one light source. An interface unit is connected to the switching unit by means of an interface connection, wherein the interface unit is arranged to control the switching unit. A control unit is connected to the interface unit, wherein the control unit is arranged to drive (Continued)

the interface unit such that the at least one light source is switched to emit a calibration pulse sequence to be received by the optical sensor arrangement to be placed with respect of the aperture. The calibration pulse sequence is arranged to initiate a calibration mode of operation of the optical sensor arrangement.

17 Claims, 5 Drawing Sheets

(52) U.S. Cl.
CPC .............................. *G01J 2001/083* (2013.01); *G09G 2320/0693* (2013.01); *G09G 2360/144* (2013.01)

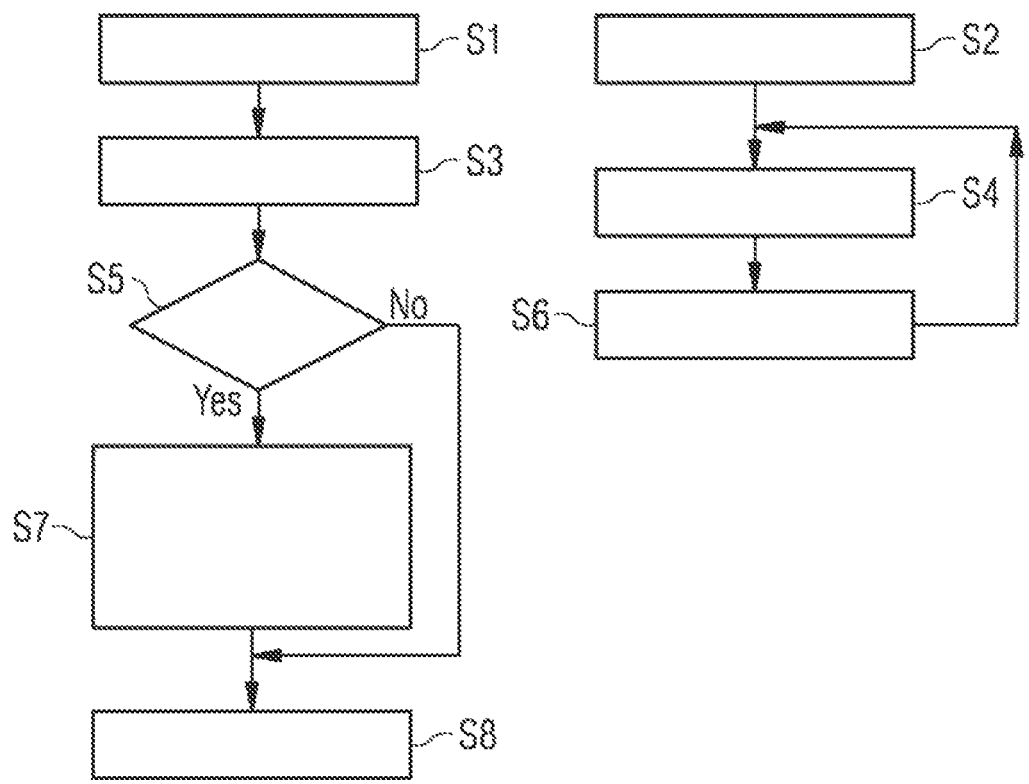

CALIBRATION ARRANGEMENT, OPTICAL SENSOR ARRANGEMENT, AND METHOD FOR ASSEMBLY LINE IN-SITU CALIBRATION OF AN OPTICAL DEVICE COMPRISING AN OPTICAL SENSOR

This invention relates to an assembly line in-situ calibration arrangement, optical sensor arrangement and a method for calibration of an optical sensor arrangement.

BACKGROUND OF THE INVENTION

Ambient light sensing (ALS) devices approximate the human eye response to light under a variety of lighting conditions. ALS devices offer a wide range of performance allowing accurate measurements in lighting environments ranging from low-light to bright sunlight. ALS devices are particularly useful for display management dimming or brightness control with the purpose of reducing power consumption, extending battery life, and providing an adapted viewing experience in diverse lighting conditions. Many ALS applications demand very high precision under numerous light sources and light conditions. Ambient light sensors such as color sensors, however, often show significant part-to-part variation. For example, organic color filters are often implemented in color sensor designs. The filters, however, are typically not well-characterized and are a source of variation.

The variation can partially be addressed by production trimming such as color binning, for example. However, this typically is only a partial solution and cannot account for system-level factors such as unit-to-unit variations in the manufacturer's inked glass. Typically, ambient light sensors reside behind a glass cover which is inked in order to hide the sensor and its electronics from sight. Past experience has shown that dark ink variations alone can easily create ±10% error in the final lux readings of a color sensor. On the other hand there is an increasing demand to attain better than ±10% accuracy.

Another solution for improving product accuracy is for the manufacturer to do an in-situ calibration on the assembly line. Many manufacturers, however, adamantly refuse to do so due to the added complexity and time required in the process. Common solutions require not only expertise but stable and characterized standard light sources and precise fixturing of those light sources. It also requires that a software calibration routine be run on the device (such as a cell phone or television) and is synchronized with the light source in order to perform the calibration. The software calibration routine must not only be synced with the external test light source, but it must also store the resulting in-situ calibration parameters as calibration data into the memory of the device (such as a cell phone or television) so that an ALS software driver can later access this data in order to apply corrections for the measured ALS or color channel data.

SUMMARY OF THE INVENTION

In one embodiment a calibration arrangement for in-situ assembly line calibration of an optical sensor arrangement comprises a calibration head, a power source, an interface unit and a control unit. For calibration the optical sensor arrangement can be placed with respect to an aperture in the calibration head.

The calibration head comprises at least one calibrated light source located behind the aperture. The aperture is provided in a housing of the calibration head. The calibrated light source is incorporated into the housing and electrically connected to a power terminal. The power source is connected to the power terminal and provides a power supply to the calibration head and to the light source. The power source comprises a switching unit which is electrically connected to the at least one calibrated light source.

The interface unit is connected to the switching unit by means of an interface connection. The interface unit is arranged to control the switching unit. For example, the interface unit is arranged to provide electrical and/or logical signals through the interface connection. Furthermore, the interface unit may comprise means to provide a protocol for sequencing these signals. For example, logical signals according to PC, or similar protocols such as PWM, can be generated and provided at the switching unit. The control unit is connected to the interface unit and is arranged to drive the interface unit. For example, the control unit may have a microprocessor, an application-specific integrated circuit (ASIC), an embedded computer, a controller or a personal computer embedded in the calibration head or implemented as an external unit.

During operation of the calibration arrangement the controller unit drives the interface unit, for example, based on an internal programming or circuitry. The control unit transmits command signals to the interface unit. In turn, the interface unit translates the received command signals into electrical and/or logical signals according to its protocol for sequencing these signals and drives the power source accordingly. As a consequence, the switching unit switches on or off the at least one calibrated light source in the calibration head.

In turn, the calibrated light sources emit a sequence of light pulses. Depending on the control unit the emitted pulses comprise a calibration pulse sequence to be received by the optical sensor arrangement. The calibration pulse sequence is arranged to initiate a calibration mode of operation in the optical sensor arrangement once it has successfully been received and detected by the optical sensor arrangement. In another embodiment the calibration head comprises another light source which does not necessarily have to be a calibrated light source. This additional light source can be a white light or infrared LED. The additional light source can be used for emitting the calibration pulse sequence instead of a calibrated light source.

Basically, the term "calibration pulse sequence" is meant to convey communication or control between the calibration head and the optical sensor arrangement. Although the calibration head generally provides communication or control to the optical sensor arrangement using the calibrated light source(s) or a dedicated additional light source, it is also possible (when the optical sensor arrangement is equipped with an optical emitter) for the optical sensor arrangement to convey communication or control to the calibration head as well. On the other hand, "calibrated light emissions" are where the calibration head provides a known or calibrated light emission from its at least one calibrated light source to the optical sensor arrangement. For example, the calibrated light source(s) provide a known irradiance of red, green, blue light etc. at a known irradiance level. The optical sensor arrangement detects and reads this known level of light that has been emitted by the calibration head.

Assembly line in-situ calibration of an optical sensor arrangement using the proposed calibration arrangement greatly enhances the detection accuracy of an optical sensor embedded in an optical device. The solution is simple for the customer to apply and minimizes the production line time needed to perform the calibration. It provides the means to the customer that enables in-situ calibration of parts and helps to remove process complexity which may stand against doing in-situ calibration in the first place. In-situ calibration inherently corrects for system errors such as aperture misalignment and dark ink variations, and also can help correct for coarse and limited gain-trimming resolution.

In at least one embodiment the housing comprises an alignment fixture which is arranged to provide an alignment registration to fix and/or to hold the calibration head with respect to an optical device comprising the optical sensor arrangement to be calibrated. For example, the customer can design the alignment fixture to fit his products and to place the calibration head against the product's sensor aperture.

In at least one embodiment the alignment fixture comprises a mechanical contact interface. In particular, the mechanical contact interface may comprise a molded material or could be made of metal or similar materials. Furthermore, the mechanical contact interface has at least a first main surface for contacting the optical device. Typically, the first main surface reassembles the main surface of the optical device in order to improve mechanical contact between the alignment fixture and the optical device. In this respect, the first main surface is either planar, concave, or convex. Additionally, the main surface can be covered with the surface padding in order to avoid compromising or damaging the optical device.

In at least one embodiment the alignment fixture comprises ferrous or magnetic guide stubs. The guide stubs are arranged for contacting and/or fixing the optical device. This is supported by ferrous or magnetic stubs located on or below the bezel surface in the optical device.

In at least one embodiment the control unit is embedded in the housing of the calibration head and comprises a microcontroller, an application-specific integrated circuit (ASIC) and/or an embedded computer. Alternatively, the control unit is arranged externally to the housing and is connected to the housing via a power and/or communications cable. In this external implementation the control unit comprises a microcontroller, an application-specific integrated circuit and/or an embedded computer.

In at least one embodiment the aperture in the housing is covered by means of one or more diffusers. Typically, the calibration head is much larger in diameter than the optical apertures and lateral alignment is not critical. Also for the same reasons small air gap variations can be tolerated. Typically a robot arm could position the calibration head, or alternately a human operator could easily do manual placement of the calibration head against the aperture. The optical head can be further improved upon, e.g. using multiple spaced diffusers, to further ensure that the light exiting the diffuser is both Lambertian, and also has a very high degree of spatial homogeneity. In another embodiment the calibration head can be designed to provide a proscribed range of angular illumination, e.g. by an angular cone of light that is non-Lambertian.

In at least one embodiment of an optical device comprises an optical sensor, a signal processing unit, and a memory unit. The optical sensor comprises at least a first light sensitive component and is arranged to collect incident light and to generate a first channel signal indicative of the collected light. The signal processing unit is connected to the optical sensor and is arranged to read and process the first channel signal. The signal processing unit further comprises decoding means and a data processor. The memory unit is connected to the signal processing unit, for example, by means of a bidirectional interface connection.

During operation the optical sensor collects incident light and generates the first channel signal. The signal processing unit reads the first channel signal and attempts to decode the first channel signal using the decoding means. For example, the decoding means comprises a linear feedback shift register logic circuit having a shift register and exclusive-or gates. The decoding means is arranged to decode from the first channel signal an optical calibration pulse sequences which is emitted by means of a calibration arrangement.

The detection of the optical calibration pulse sequence the signal processing unit initiates a calibration mode of operation in the optical sensor arrangement. In this calibration mode of operation the optical sensor arrangement is set to receive a set of calibrated light emissions or pulses from calibrated light sources embedded in the calibration head of the proposed calibration arrangement. The data processor is arranged to derive calibration data from the detected channel signal, i.e. the first channel signal, for example. The calibration data so collected is then stored in the memory unit for further use during a normal mode of operation of the optical device.

In at least one embodiment the optical sensor comprises further light sensitive components which are arranged to collect incident light and generate further channel signals indicative of the collective light. The signal processing unit is further arranged to read and process to further channel signals. The data processor derives calibration data depending also on the further channel signals which are then stored as calibration data on the memory unit.

For example, the optical sensor is a photodiode, i.e. has just a single light sensitive component giving rise to the first channel signal. However, the optical sensor may comprise more than a single photodiode, i.e. more than a single light sensitive component each giving rise to the further channel signals. The optical sensor can generally be an ambient light sensor, color sensor, active proximity sensor designed as single or more components or designed as an array of sensors. The calibration data is stored on the memory unit so that it can be read during normal operation of the optical device and such that each data can be attributed to a respective sensor channel or sensor component.

In at least one embodiment the optical sensor comprises at least one light emitting device. The signal processing unit is arranged to generate a feedback signal by means of the light emitting device. The feedback signal is emitted as a response to the detection of the optical calibration pulse sequence, for example, as a handshake to indicate to the calibration arrangement that the optical calibration pulse sequence has been detected.

In at least one embodiment the memory unit comprises a non-volatile memory. In particular, the non-volatile memory is an electrically erasable and/or one-time programmable memory. The memory unit can be implemented as an onboard memory or as an off board memory. The optical sensor arrangement may be implemented as an integrated circuit.

In at least one embodiment the memory unit comprises a write once memory having an optical calibration fuse. The optical calibration fuse can be set active or inactive, i.e. blown or unblown, respectively. The optical calibration fuse is read from the memory unit by means of the signal processing unit. Depending on the states of the optical calibration fuse, i.e. blown or not blown, the optical calibration fuse is indicates whether the calibration mode of operation has been initiated in the optical sensor arrangement or previously finished. For example, if the optical calibration fuse is found to be blown already the calibration mode of operation is not going to be executed as the optical device has already been calibrated before.

In at least one embodiment a calibration routine unit is connected to the signal processing. The calibration routine unit is arranged to execute a calibration routine once the calibration mode of operation has been initiated.

In one embodiment a method for in-situ assembly line calibration of an optical sensor arrangement comprises the following steps. First, a calibration arrangement having a calibration head is aligned with respect to the optical sensor arrangement. A pre-calibration mode of operation is initiated in the optical sensor arrangement, wherein the optical sensor arrangement is set to receive a calibration pulse sequence from a light source embedded in the calibration head. The calibration pulse sequence is to be emitted by means of at least one light source embedded in the calibration head of the calibration arrangement.

A calibration mode of operation is initiated in the optical sensor arrangement after the calibration pulse sequence has been received. The optical sensor arrangement is set to receive light from at least one calibrated light source. For example, the calibrated light source and the at least one light source can be identical or two or more different light sources. Calibration data is derived from light received from the calibrated light source. The calibration data is stored in a memory unit of the optical sensor arrangement. Finally, the calibration mode of operation is terminated and the optical sensor arrangement enters a normal mode of operation. The calibration data can accessed from the memory unit during the normal mode of operation.

The proposed solution requires the customer to provide power to the optical device and to apply the optical calibration head against the aperture of the optical sensor arrangement. Generally, electronic devices such as cell phones and televisions are turned on at some point in the assembly line to verify that the device powers up and operates correctly. The optical calibration head would be provided to the customer. The customer would have to design an alignment fixture to place calibration head against the product's sensor aperture. The calibration head would typically be designed with a diffuser head with the understanding that the diffuser would be placed in contact with the sensor aperture on the end product. From this point calibration head initiates the calibration process using optical or infrared (IR) signaling. Thereon out the calibration process can proceed in an autonomous manner that is essentially transparent to the customer. As a result the optical sensor arrangement stores the acquired calibration data into its internal or external memory. From the customer standpoint, the two remaining challenges are:

1) Providing power to the optical sensor arrangement by powering up the optical device on the assembly line and,
2) Fixturing the calibration head against the end-product's sensor aperture.

In at least one embodiment the optical sensor arrangement comprises a light source and acknowledges that the calibration pulse sequence has been received. The feedback is established by emitting a feedback signal by means of the at least one light source or calibrated light source.

In at least one embodiment the calibration mode of operation is executed autonomously, i.e. communication between the calibration head and the optical sensor arrangement is executed without any user interaction once the calibration mode of operation has been initiated.

In at least one embodiment the calibration mode of operation involves at least of the following steps: Initially, a first calibrated light source is activated in the calibration head. Then light emitted from the activated light sources is recorded by means of the optical sensor arrangement and a first channel signal is generated from the optical sensor. The first channel signal is indicative of the incident light. The first channel signal is processed and first calibration data is derived for the first calibrated light sources. The first calibration data is then stored for use during normal mode of operation. For example, the calibration data can be read by a system driver of the optical device.

The steps above can be repeated by consecutively activating all calibrated light sources in the calibration head. For example, the set of steps can be executed once if only a single calibrated light source is present. Several light sources may be present and the calibration may occur for each individual light source separately. This may be the case if the optical sensor is a color sensor having different channels sensitive to different spectral ranges or colors. The calibration mode of operation is terminated when calibration data has been stored for all calibrated light sources embedded in the calibration head.

In at least one embodiment some or all of the steps executed during the calibration mode of operation are acknowledged by emitting the optical calibration pulse sequence using the optical sensor arrangement.

In at least one embodiment the calibration mode of operation is executed based on a predetermined timeframe with no synchronization between the calibration head and the optical sensor arrangement.

BRIEF DESCRIPTION OF THE DRAWINGS

In the following, the concept presented above is described in further detail with respect to drawings in which exemplary embodiments are presented.

FIG. 6 shows a general scheme of a method for assembly line in-situ calibration of an optical sensor according to the present concept.

DETAILED DESCRIPTION

Figure 1:
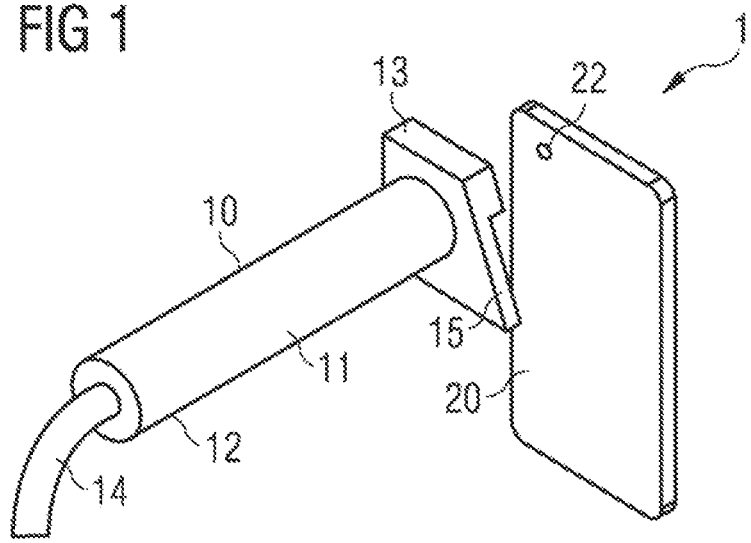
FIG. 1 shows a calibration arrangement according to the present concept.
Figure 1:
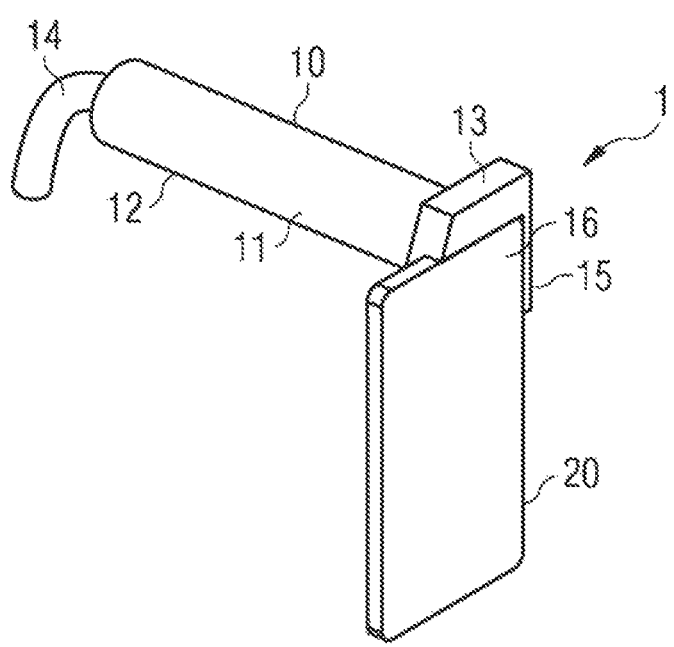

FIG. 1 shows a calibration arrangement 1 according to the present concept. In particular, the drawings depict the alignment of a calibration head 10 with respect to an optical sensor 21 to be calibrated which is embedded in an optical device 20, such as a cell phone case, for example.

The calibration arrangement 1 comprises the calibration head 10 having a housing 11 and a handle 12. The housing 11 has an alignment fixture 13 at one end and a power and/or control cable 14 connected to the other end of the housing 11. The alignment fixture 13 is arranged to provide an alignment registration to fix or hold the calibration head 10 with respect to the optical device 20 to be calibrated. In order to provide precise and reproducible alignment, the fixture 13 provides a mechanical contact interface 15 which serves as a reference frame to guide and attach the optical device 20 with respect to a mated or registered position (see FIG. 1 lower part).

The alignment fixture 13 can be adapted specifically to a certain optical device 20 and can be made detachable or interchangeable from the housing 11 so that different devices can be calibrated with a single calibration head 10. As the alignment fixture 13 typically is adapted to the geometry of the optical device 20 having the optical sensor arrangement 2 it may have a flat, concave or convex main surface. The main surface can be framed by the mechanical contact interface 15. The mechanical contact interface 15 can be a recess or a protrusion in the fixture (see FIG. 1). The alignment fixture 13 can be made of metal or of a molded material, for example, using silicone or rubber. Typically the alignment fixture 13 shown in FIG. 1 would also have surface padding using a material such as rubber or a Teflon coating, to prevent the alignment fixture 13 from inadvertently scratching the optical device 20, such as a cell phone glass when coming into mechanical contact, for example.

FIG. 1 illustrates how the calibration head can be aligned with respect to a case of a cell phone, as an example. In the upper part of FIG. 1 the calibration head 10 is moved towards the optical device 20 having the optical sensor 21 to be calibrated while the device 20 is still on the assembly line, for example. Typically, a robot arm could position the calibration head 10, or alternately, a human operator could do manual placement of the calibration head 10 in front of the optical sensor arrangement 2. The alignment is guided through the mechanical contact interface 15 until the calibration head 10 reaches a mated or registered position 16 as depicted in the lower part of FIG. 1. Alignment is completed when the alignment fixture 13 is positioned or attached to the optical device 20 at the mated or registered position 16.

The example in FIG. 1 assumes, e.g. that in the optical device 20 an optical sensor arrangement 2 is present and resides behind an optical aperture 22 in the device 20, such that the device 20 is capable of receiving and processing light to be emitted from the calibration head 10. Since the calibration head 10 is much larger in diameter than the optical aperture 22 used in the device 20 for the optical sensor arrangement 2, lateral alignment is not critical, and also for the same reasons small air gap variations can be tolerated.

The calibration head 10 can be further improved upon by using one or multiple spaced diffusers to further ensure that light exiting the diffuser is both Lambertian and also has a very high degree of spatial homogeneity. In another embodiment (not shown) the calibration head 10 can be designed to provide a proscribed range of angular illumination (e.g. an angular cone of light having an angle $\theta$ between $0°<\theta<\theta_{max}$) that is non-Lambertian, wherein $\theta_{max}$ is a maximum angle determined by the aperture of the diffuser.

In another embodiment (not shown), the optical device 20, for example a television or computer monitor comprising the optical sensor arrangement 2, could be manufactured to contain ferrous or magnetic guide stubs that lie invisible beneath a bezel surface. The proposed calibration head arrangement 1 could then be equipped with similar magnets (or ferrous material) that would be attracted to the bezel guide stubs so as to automatically bring the calibration head 10 into alignment.

Figure 2:
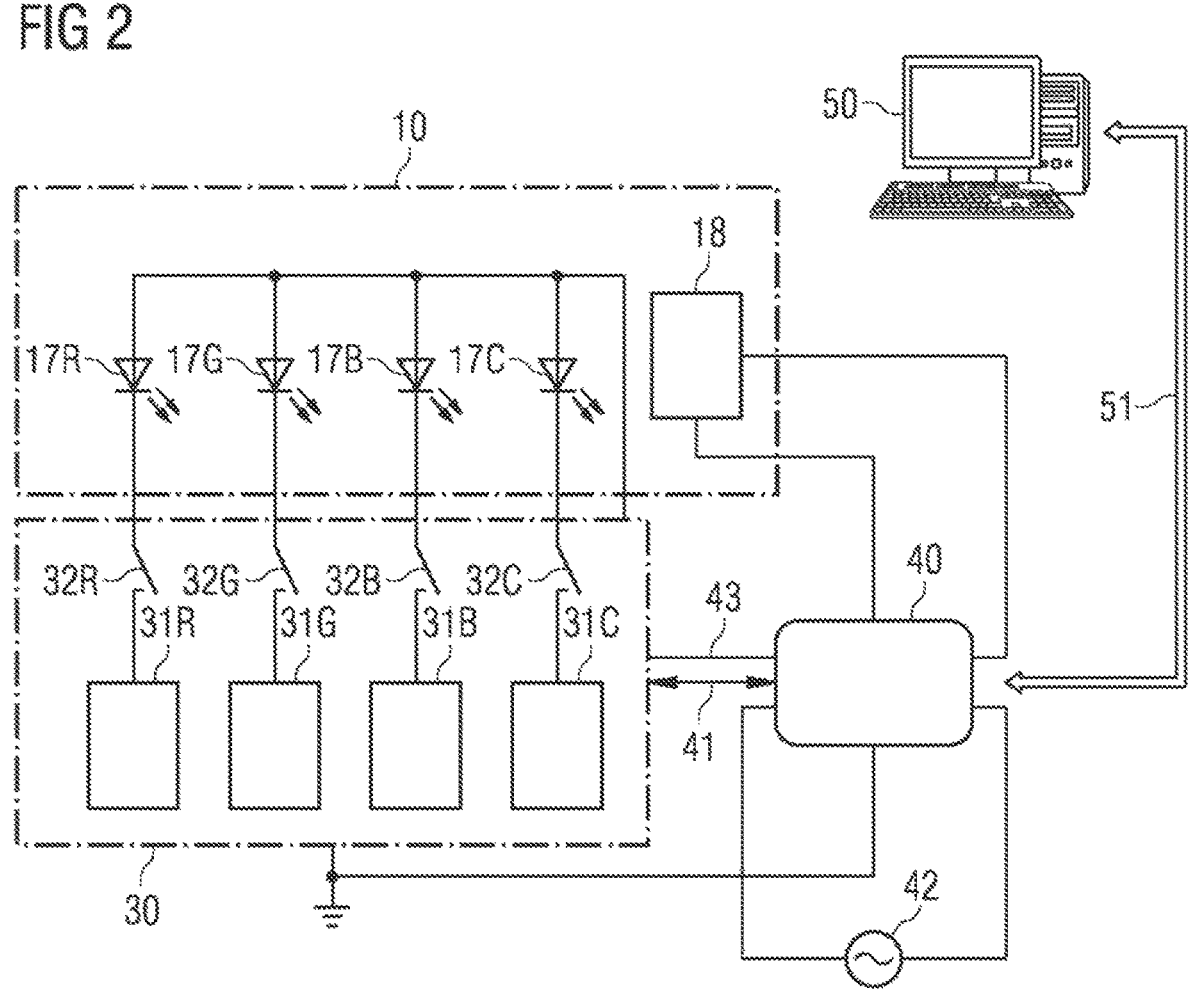
FIG. 2 shows an embodiment of a calibration arrangement according to the present concept.

FIG. 2 shows an embodiment of a calibration arrangement according to the present concept. Generally, the calibration arrangement 1 comprises the calibration head 10, a power source 30 and an interface unit 40.

The calibration head 10 comprises several light sources. Four light emitting diodes 17R, 17G, 17B, 17C are arranged to emit different colors such as red, green, blue and white light, respectively. The white light emitting diode 17C could be exchanged or complemented with an infrared (IR) light emitting diode. The LEDs 17R, 17G, 17B, 17C form an array and are electrically connected to the power source 30 and the interface unit 40. Instead of light emitting diodes other types of calibrated light sources can be used, such as gas discharge lamps, fluorescent tubes or incandescent light sources. Furthermore, in this particular embodiment, the calibration head 10 further comprises an infrared optical sensor 18, for example, an infrared photodiode.

The light emitting diodes 17R, 17G, 17B, 17C are connected to the power source 30. In this particular embodiment, the power source 30 comprises respective constant current sinks 31R, 31G, 31B, 31C for each light emitting diode implemented in the calibration head 10. Each constant current sink 31R, 31G, 31B, 31C is connected to a respective light emitting diode 17R, 17G, 17B, 17C by means of a controllable switch 32R, 32G, 32B, 32C which is connected to the interface unit 40 by means of an interface connection 41. The power source 30 is further connected to electrical ground. Alternatively, the constant current sinks can exchanged with constant current sources, respectively.

The emission characteristics of the colored light emitting diodes 17R, 17G, 17B are calibrated, i.e. the LEDs are calibrated light sources. The LEDs 17R, 17G, 17B are configured for known parameters such as luminous intensity, averaged LED intensity and/or luminous flux, for example. The calibration head may further comprise means to determine a color temperature of the LEDs in order to account for thermal effects on the LEDs emission characteristics.

The interface unit 40 is connected to a power supply 42, for example 120 VAC or 240 VAC from a wall outlet associated with the assembly line. The interface unit 40 routes power to the power source 30, the light emitting diodes and the infrared optical sensor by means of power connection 43. Typically, the interface unit 30 comprises a DC power converter which is connected to the AC power supply at the assembly line. However, the interface unit 40 can also receive DC power through an externally connected control unit 50 such as a PC, for example, via a power USB connection 51.

Furthermore, the interface unit 40 comprises means to provide electrical and/or logical signals through the interface connection 41 and comprises means to provide a protocol for sequencing these signals. For example, logical signals according to I²C, or similar protocols such as PWM, can be generated and provided at the power source 30, light sources and optical sensor through the respective interface connections. The interface unit 40 serves as an interface to an internal or external control unit 50. In this particular embodiment the control unit 50 is implemented externally by means of a personal computer (PC) or a controller connected to the PC. The interface unit 40 is connected to the PC controller through another interface connection 51, such as a USB cable connector.

The control unit 50 orchestrates the optical calibration by controlling the interface unit 40. The interface unit 40 translates commands received from the controller unit 50 into electrical and/or logical signals according to the interface units sequencing protocol, e.g. I²C, PWM or the like. As a consequence, the power source 30 is controlled according to the signaling of the interface unit 40. In particular, a given light emitting diode 17R, 17G, 17B, 17C can be selected by electrically connecting the associated current sink 31R, 31G, 31B, 31C from the power source 40 and according to the signaling from the interface unit 30. The switching is established by means of a switching unit 32 comprising switches 31R, 31G, 31B, 31C coupled between the current sinks 31R, 31G, 31B, 31C and the light emitting diodes 17R, 17G, 17B, 17C, respectively. The switches are opened or closed according to the signaling of the interface unit 40.

Furthermore, the interface unit 40, controlled by the control unit 50, not only switches individual light emitting diodes on or off but establishes an optical communication between the calibration head 10 and the optical sensor arrangement 2 to be calibrated. In particular, signal sequences can be established by switching one or more of the light emitting diodes 17R, 17G, 17B, 17C in a sequence defined by the control unit 50. This way an optical calibration pulse sequence is generated and emitted by the LEDs.

The calibration head 10 may emit the calibration pulse sequence using the white LED 17C (for example in the case the optical sensor is a sensor sensitive to UV/VIS, such as a color sensor), or employ an infrared (IR) LED (for example, in the case of an optical sensor having an IR-sensitive sensor). In turn, the optical sensor 21 is adapted to receive and process the optical calibration pulse sequences emitted by one or more light emitting diodes in the calibration head 10.

The optical calibration pulse sequence is encoded using an optical transmission signaling protocol. The protocol may use a differential Manchester encoding scheme as protocol such that a clock or a timing information is actually embedded together with a data stream in a single optical signal. Alternately, an I²C clock signal could be encoded using one color LED (such as the blue LED) and the data could be encoded in the emission of another colored LED (such as IR or red LED). In yet another embodiment, an RS232 type of signaling scheme could be used (another example of asynchronous communication where data timing/synchronization is accomplish without the use of a separate clock signal).

Optical commands can be encoded into the calibration pulse sequence, e.g. commands like "initiate calibration mode of operation", "read channel signal CH1", "read channel signal CH2", "read channel signal CH3" etc., or "finalize calibration mode of operation" etc. The optical commands can be defined by respective pseudo-random sequences such as maximal length sequences (MLS). MLS sequences can be encoded and/or decoded using a linear feedback shift register type of architecture, for example implemented in the interface unit 40 or in the optical sensor arrangement 2. In this way the optical commands can be made unique so that the optical sensor arrangement 2 does not erroneously get triggered into a calibration mode of operation, for example once the optical device 20 has been calibrated and should operate in a normal mode of operation. Various MLS generator polynomials can be used to generate unique random sequences such that different generators (such as linear feedback shift registers) can be used to denote different commands.

Figure 3:
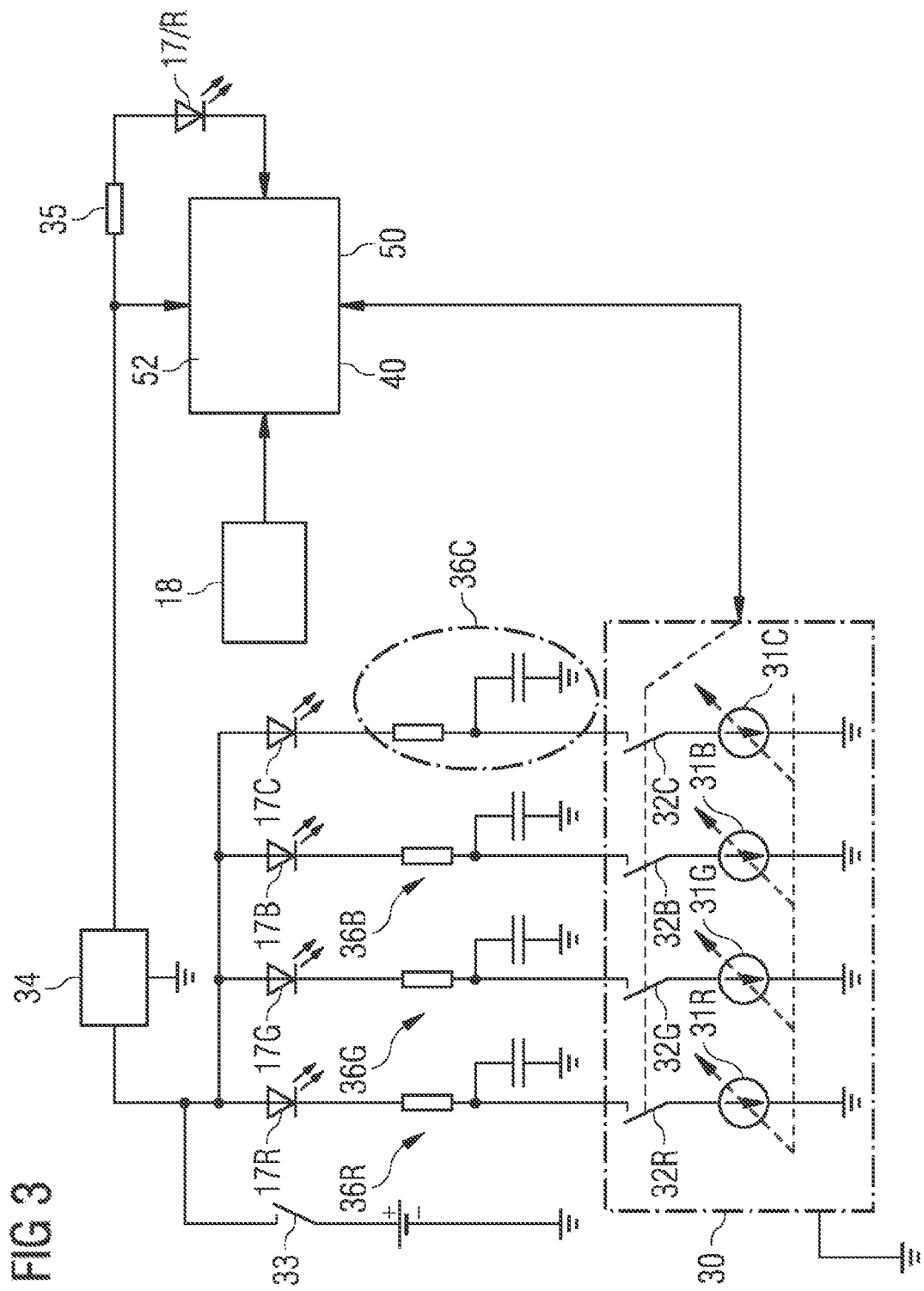
FIG. 3 shows another embodiment of a calibration arrangement according to the present concept.

FIG. 3 shows another embodiment of a calibration arrangement according to the present concept. The calibration arrangement is based on the one depicted in FIG. 2 but is implemented in a common housing of the calibration head 10.

The calibration head 10 comprises the four light emitting diodes 17R, 17G, 17B, 17C which are arranged to emit different colors such as red, green, blue and white light, respectively. The emission characteristics of the colored light emitting diodes 17R, 17G, 17B and the white light LED 17C are calibrated, i.e. the LEDs are calibrated light sources. The four LEDs 17R, 17G, 17B, 17C form an array and are electrically connected to the power source 30 by means of (optional) RC filters 36R, 36G, 36B, 36C, respectively. Furthermore, a power switch 33 is connected to the array of LEDs. The light emitting diodes 17R, 17G, 17B, 17C are connected to the power source 30, i.e. via respective constant current sinks 31R, 31G, 31B, 31C for each light emitting diode.

Furthermore, an infrared LED 171B is embedded in the calibration head. This LED is used for optical communication to the optical sensor arrangement and emits light in the infrared. The infrared LED 171R is connected to the power switch 33 and array of LEDs by means of a grounded voltage converter 34, for example. A resistor 35 is implemented for current limiting.

The infrared LED 171R is connected to a microcontroller 52. The microcontroller 52 comprises the functionality of the interface unit 40 and control unit 50, i.e. it switches individual light emitting diodes on or off and establishes optical communication between the calibration head 10 and the optical sensor arrangement 2 to be calibrated. The microcontroller is arranged to control the power source 30 via the interface connection 41. In other words, the microcontroller comprises both interface unit 40 and control unit 50 as sub units.

The (optional) infrared optical sensor 18 is connected to the microcontroller 52 and is arranged for receiving the feedback from the optical sensor arrangement. The infrared optical sensor 18 may also have a Schmitt Trigger for signal conditioning.

Figure 4:
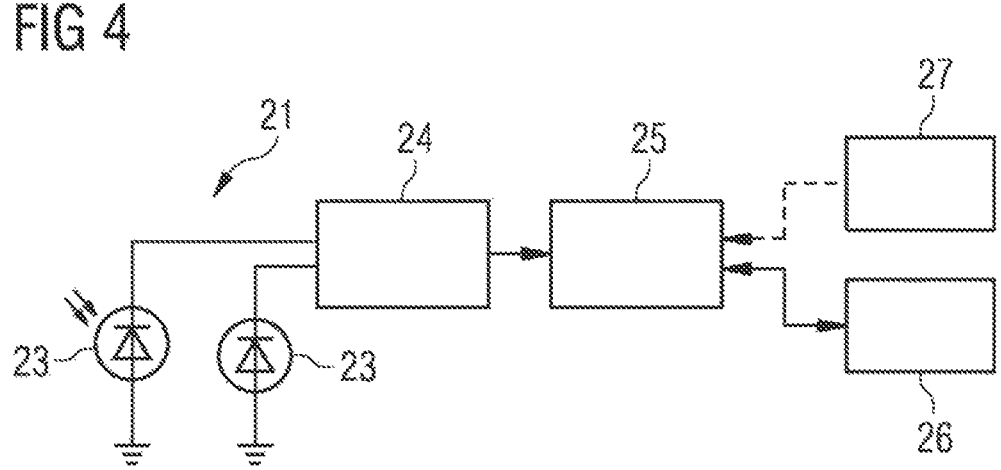
FIG. 4 shows an embodiment of an optical sensor for an optical device according to the present concept.

FIG. 4 shows an embodiment of an optical sensor arrangement for an optical device according to the present concept. The alignment of the optical sensor arrangement 2 using the calibration head 10 as discussed above is based on optical communication between the calibration head 10 and the optical device 20, i.e. the device comprising the optical sensor arrangement 2. The optical sensor arrangement 2 comprises at least one light sensitive component 23 or optical sensor, for example a photodiode, which is sensitive to light being emitting by one or more of the light emitting diodes 17R, 17G, 17B, 17C embedded in the calibration head 10. As this type of optical sensor arrangement 2 only has light sensitive components and does not comprise any light emitter it will be referred to as a "one way optical communication sensor" hereinafter.

The one or more light sensitive components 23 are connected to a light-to-digital converter 24. The light-to-digital converter 24 is adapted to convert a sensor signal received by the optical sensor 23 into a signal readable by a signal processing unit 25 following downstream in the detection path. The light sensitive component(s) 23 are connected to the signal processing unit 25 which may comprise a processor and/or a sequential state machine. Furthermore, the signal processing unit 25 may have means to decode the optical calibration pulse sequence emitted from the calibration head 10. For example, a linear feedback shift register type of architecture can be employed for decoding. However, decoding can also be performed as part of a microprocessor or ASIC. Furthermore, the signal processing unit 25 is also connected to a calibration routine unit 27. The calibration routine unit may comprise a microprocessor, sequential state machine or may be part of the signal driver of the optical device 20 into which the optical sensor arrangement 2 is implemented.

Additionally, the signal processing unit 25 is connected to a memory unit 26 by means of a bidirectional connection, i.e. data can be written to the memory or be read out from the memory. The memory unit 26 may comprise a non-volatile memory, for example, electrically erasable (EE)

and/or one-time programmable (OTP). In this embodiment the memory unit 26 uses fuses as a non-volatile memory element. The fuses constitute a write once memory.

One fuse could be denoted as the "optical calibration fuse" which initially is closed or "unblown", and can be read out immediately after power-up of the optical device 20. If that fuse is not "blown", that information can be used to enter a pre-calibration mode of operation (see below) and the device 20 recognizes that it should receive the optical calibration pulse sequence and look for the optical command to enter into a calibration mode of operation. If the device 20 does not receive this "calibration command" within a certain period of time it resumes or enters into a normal mode of operation. If it receives the "calibration command", however, the device 20 initiates the calibration mode of operation which will be discussed in further detail below.

For example, consider the embodiment where an I$^2$C clock signal could be encoded using one color LED 17R, 17G, 17B (such as the blue LED 17B) and data could be encoded in the emission of another colored LED (such as IR or red LED 17R) mentioned above. The optical sensor 21 would then detect both the data stream combined with the clock signal as a first channel signal CH1, and a second channel CH2 would detect only the clock signal. Part of the second channel signal CH1 could be subtracted from the first channel signal CH1 so that only the data signal would remain. A Schmitt-Trigger could be implemented for signal-conditioning, and after Schmitt trigger signal-conditioning, the signals/commands could then be decoded by the decoding means, for example, I$^2$C logic. In a color sensor device with proximity or gesture capabilities, an output of the one channel would contain the I$^2$C data signal, and another output, e.g. PROX/Gesture channel(s) or RED channel, would contain the I$^2$C clock signal.

As a result calibration data are determined and recorded into the fuse memory. The optical device 20 then blows the "optical calibration fuse" in order to indicate it has been calibrated. From there on out, each time the optical device 20 is powered up, it reads the optical calibration fuse and finds it already blown, in which case it immediately enters or resumes normal mode of operation and does not attempt to proceed with the calibration mode of operation.

In other embodiments (not shown) the memory unit 26 can be on-board memory, or off-board memory. For example, the optical sensor arrangement 2 may at least partly integrated as an integrated circuit (IC)). In the latter case the device 20 could act as an I$^2$C master, e.g. to write to an external EEPROM device. Optionally, the optical device 20 or optical sensor arrangement 2 may have means for compression of parameters or calibration data. This can involve storing the deviation of a channel count from a mean value, and/or not saving the least significant bits of the deviation. As a result of reduction the optical device 20 may use only 16 fuse bits to do color binning, for example.

Figure 5:
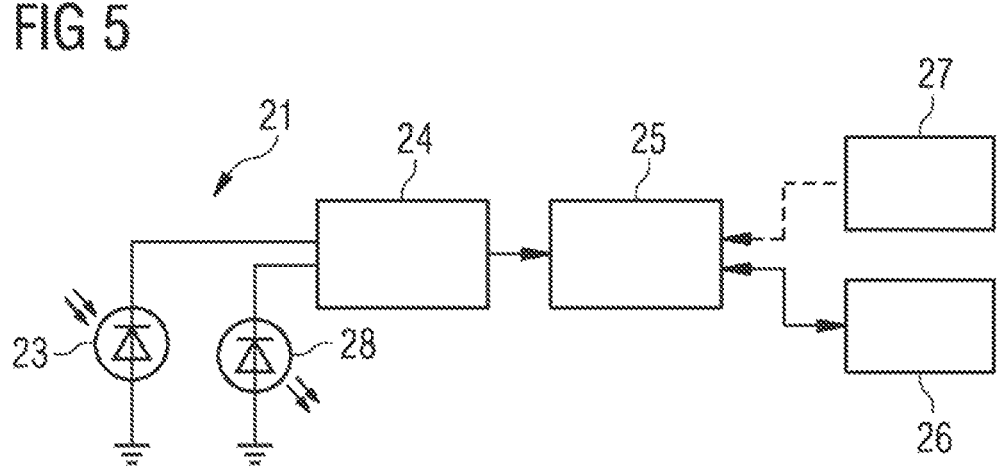
FIG. 5 shows another embodiment of an optical sensor for an optical device according to the present concept.

FIG. 5 shows another embodiment of an optical sensor arrangement for an optical device according to the present concept. The calibration arrangement 1 is based on the one depicted in and discussed with respect to FIG. 3 but comprises also a light emitting component 28, for example a light emitting diode (for example a white or an IR LED). As this type of optical sensor arrangement 2 has both light sensitive components and a light emitter it will be referred to as a "two way optical communication sensor" hereinafter.

FIG. 6 shows a general scheme of a method for assembly line in-situ calibration of an optical sensor according to the present concept. The drawing summarizes a typical scenario for calibrating an optical sensor 21, such as an ambient light sensor (ALS) or a color sensor, for example, using one way optical communications as defined above.

Generally, the calibration procedure involves two devices, i.e. the calibration head 10 and a consumer device 20 comprising the optical sensor arrangement 2. The calibration procedure relies on optical communication between the calibration head 10 and the optical sensor arrangement 2. In the drawing procedural steps performed on the consumer device 20 or optical sensor arrangement 2 are shown in the left column. Procedural steps performed on the calibration head 10 are shown in the right column.

Generally, electronic products and consumer devices such as cell phones and televisions are turned on at some point in the assembly line to verify that the device 20 powers up and operates correctly. In step s1 the consumer device (e.g. cell phone) is powered up or assumed to be powered up such that the embedded optical sensor arrangement 2 is receiving power, typically DC power. At the same time or parallel to powering up the consumer device 20 the calibration head 10 is also turned on or has already been powered up (step s2). As a result both the consumer device 20 and the calibration head 10 are ready for their intended operation.

In step s3 the optical sensor arrangement 2 enters into a pre-calibration mode of operation and looks for receiving an optical command embedded in an optical calibration pulse sequence emitted by at least one of the LEDs 17R, 17G, 17B, or 17C in the calibration head 10, e.g. the white IR LED 17C. The optical sensor arrangement 2 in the optical device 20 can be arranged to be vigilant for a short time after power-up, for example 500 msec, to look for said optical calibration pulse sequence. The steps of the pre-calibration mode of operation can be repeated, for example every 500 msec, until a calibration pulse sequence is received.

After turning on the calibration head 10 emission of an optical calibration pulse sequence including the optical command for entering calibration can be initiated (step s4). Step s4 is initiated by means of the controller unit 50, for example by interaction between the interface unit 40 and the PC or user. Typically, the white light emitting diode 17C or infrared light emitting diode is used for this purpose.

If the consumer device 20 including the optical sensor arrangement 2 recognizes or decodes the "calibration command" from the optical calibration pulse sequence after power up (step s5) the device enters a calibration mode of operation (step s7). For example, the optical device 20 waits for another pulse group of the optical calibration pulse sequence as the calibration head 10 typically repeatedly transmits a number of calibration pulses. Typically, an optical calibration pulse sequence is sent as a group of pulses and after a certain dead time (step s6) another optical calibration pulse sequence is sent out by the respective LED. This optical calibration pulse sequence may be repeated for a pre-determined number of times or until stopped by the control unit or by user interaction.

For the optical device 20 to enter into the calibration mode of operation it attempts to decode the optical calibration pulse sequence to extract the "calibration command" from the optical calibration pulse sequence. As discussed above this optical command can be encoded as an MLS code, for example. If this code has not been identified or erroneously been received, the recognition and decoding is retried again. If the optical device 20 does not receive the "calibration command" within a certain period of time, then it would exit and terminate the calibration mode (step s8) and operate in normal mode of operation, for example waiting for I$^2$C instructions from the consumer device's software drivers or processors.

As soon as the "initiate calibration" command has been received and decoded the optical device enters and initiates the calibration mode of operation (step s7) which involves several sub-steps and optical communication between the calibration head 10 and the consumer device 20.

At the same time, the calibration routine unit 27 on the optical sensor arrangement 2 starts executing a calibration routine which drives the operation of the optical sensor arrangement 2 during calibration. Typically, at power-up the calibration routine unit 27 sets certain variables and parameters, such as integration time and gain, in order to integrate light emitted by the calibration head 10 and derive calibration data from corresponding sensor signals.

In a one way optical communication sensor it is assumed that the optical sensor arrangement 2 is ready for illuminating the device optical sensor arrangement 2 via its aperture with the standardized or calibrated LEDs or light sources. There is no feedback. The calibration routine proceeds according to a predetermined time frame.

The control unit 50 initiates the activation of a first colored LED (the red LED 17R, for example). The interface unit 40 receives a corresponding command from the control unit 50 and translates this command according to its signaling protocol (I²C or PWM, for example). The white or IR LED 17C is activated and emits an optical calibration pulse sequence including an optical command which indicates to the optical sensor arrangement 2 that the first colored LED 17R is going to be activated. Correspondingly, the calibration routine unit 27 starts integration of the first sensor or channel signal associated to the emission of the first LED 17R on the calibration head 10.

In turn, the interface unit 40 controls the power source 30 or, more precisely, the respective current sink 31R connected to the first LED 17R by operating or switching the respective switch 32R. In one embodiment the interface unit 40 activates only a single light source (such as the white LED 17C at a determined irradiance level, such as 250 μW/cm2, for example), or, in another embodiment, several or all light 17R, 17G, 17B, and 17C sources are activated in a predetermined sequence such as red LED, followed by green, blue, IR etc. This is done at pre-determined parameters such as irradiance levels as discussed above.

This procedure can be repeated according to the number of calibrated light sources present in the calibration head 10. This way several sensor or channel signals for each of the colored LEDs (red, green, blue, for example) are recorded by the optical sensor arrangement.

Alternatively, the calibration mode of operation can proceed without emission of dedicated optical commands which indicate to the optical sensor arrangement 2 that a certain colored LED is going to be activated. In such an embodiment the calibration routine unit 27 may simply run a calibration routine on the optical sensor arrangement 2 assuming that the respective emission of colored LEDs is executed on the calibration head at specific and predetermined times.

The recorded sensor or channel signals are processed on the optical sensor arrangement 2 by means of its signal processing unit 25. As a result calibration data are determined and assigned to the respective colored LEDs (red, green, and blue, for example). For example, depending on the type of optical sensor arrangement 2, the sensor signals are recorded as channels and the signals are represented as channel counts, or CRGB (clear, red, green, blue) counts. The sensor signals can be stored in the memory unit 26 of the optical sensor arrangement 2. In order to save area the sensor processing unit 25 can be adapted to reduce the sensor signal data. The results are then stored in the memory unit 26 as reduced calibration data.

As indicated above the memory unit 26 may comprise non-volatile memory. In the simplest case, the memory could take the form of fuses. In other cases there might be on-board memory, or off-board memory where the optical sensor arrangement could act as an I²C master, e.g. to write to an external EEPROM device). Optionally compression of the parameter data can be done e.g. by storing the deviation of the channel count from a mean value, and/or not saving the least significant bits of the deviation.

In another implementation the sensor signal can be represented as raw channel count responses and could be stored directly with no reduction/compression. In this case it can still be shown that only minimal additional silicon area is required. Obviously storing 10 bits per channel may be too much, and various methods of reducing the required fuse memory already exist. A single point calibration might likely suffice in some devices, so that using only 4 fuse bits (providing 16 gain adjust states), the in-situ calibration would correct for dark ink variations to provide a more accurate sensor in the final product, for example.

A difference to current "color binning" processes in production is that the proposed calibration can be done in-situ in the actual end device 20, so as to correct not only for part-to-part variation, but also to correct for dark ink variations, aperture-alignment/air-gap variations etc. In addition the process is done as autonomously as possible so as to take this complexity off of the manufacturer's responsibility, and to make the calibration process much faster.

In the case of two way optical sensor another level of optical communication can be introduced. If the optical device 20 comprises a light emitter 28 it is capable of bidirectional or two-way optical communications. The optical emitter 28 may be a white light LED or IR LED. The light emitter 28 implemented in the optical sensor arrangement 2 would allow for implementing a feedback routine. For example, the sensor arrangement 2 could also signal back a feedback signal or "handshake" to the calibration head 10 that it has completed or started calibration. Optionally it could even relay back the sensed response (such as CRGB counts in the case of a color sensor) to the calibration head 10, where the data could then be stored back to the control unit 50 controlling the calibration head 10. This would enable collection of assembly line statistics, allowing production to track device variations/statistics etc.

Once the calibration has been finalized and calibration values been stored, the calibration mode of operation can be ended or terminated. The device 20 having the optical sensor arrangement 2 will enter a normal mode of operation or simply be turned off. The end of the calibration mode of operation can be indicated to the optical sensor arrangement 2 by a "finalize calibration" optical command encoded in the optical calibration pulse sequence emitted by the calibration head 10. Alternatively, the optical sensor arrangement 2 may assume finalization of calibration as soon as its calibration routine has been completely executed.

During normal mode of operation of the device 20 having the optical sensor arrangement 2 can access the calibration data, for example by means of its system driver, and include the data in its evaluation and signal processing of respective sensor signals collected by the optical sensor arrangement.

The invention claimed is:

1. A calibration system for in-situ assembly line calibration, wherein the calibration system comprises:
   an optical sensor arrangement embedded in an optical device, and a calibration arrangement,
wherein the calibration arrangement comprises:
- a calibration head comprising at least one calibrated light source located behind an aperture in a housing and being electrically connected to a power terminal,
- a power source connected to the power terminal, the power source comprising a switching unit electrically connected to the at least one calibrated light source,
- an interface unit connected to the switching unit by an interface connection, wherein the interface unit is arranged to control the switching unit, and
- a control unit connected to the interface unit, wherein the control unit is arranged to drive the interface unit such that the at least one calibrated light source is switched to emit an optical calibration pulse sequence to be received by the optical sensor arrangement placed with respect of the aperture, and wherein the optical calibration pulse sequence is arranged to initiate a calibration mode of operation of the optical sensor arrangement,
- wherein the optical calibration pulse sequence comprises one or more encoded optical commands which, upon detection by the optical sensor arrangement, indicate to the optical sensor arrangement to initiate the calibration mode of operation of the optical sensor arrangement, and
- wherein the control unit is further arranged to drive the interface unit such that the at least one calibrated light source emits a sequence of light pulses during the calibration mode of operation, wherein the optical sensor arrangement comprises:
- an optical sensor comprising a first light sensitive component and arranged to collect incident light and to generate a first channel signal indicative of the collected light,
- a signal processing unit connected to the optical sensor and arranged to read and process the first channel signal, wherein the signal processing unit comprises:
  - a decoding circuit arranged to decode from the first channel signal the optical calibration pulse sequence emitted by the calibration arrangement and arranged to initiate the calibration mode of operation depending on the detection of the optical calibration pulse sequence, and
  - a data processor arranged to derive calibration data depending on the first channel signal, and
- a memory unit connected to the signal processing unit and arranged to store the calibration data, and wherein:
- the optical sensor arrangement is operable, in a pre-calibration mode of operation, to receive the optical calibration pulse sequence emitted by the at least one calibrated light source,
- the optical sensor arrangement is operable, in the calibration mode of operation, to receive the sequence of light pulses emitted by the at least one calibrated light source,
- the decoding circuit is operable, in the pre-calibration mode of operation, to decode from the first channel signal the optical calibration pulse sequence and to initiate the calibration mode of operation, and
- the data processor is operable, in the calibration mode of operation, to derive the calibration data based on the sequence of light pulses.

2. The calibration system according to claim 1, wherein the housing comprises an alignment fixture arranged to provide an alignment registration to fix and/or to hold the calibration head with respect to the optical device.

3. The calibration system according to claim 2, wherein:
- the alignment fixture comprises a mechanical contact interface and/or a molded mechanical contact interface,
- the mechanical contact interface has at least a first main surface for contacting the optical device, and
- the first main surface is planar, concave, convex and/or covered with a surface padding.

4. The calibration system according to claim 2, wherein the alignment fixture comprises ferrous or magnetic guide stubs for contacting and/or fixing ferrous or magnetic stubs located on or below a bezel surface in the optical device.

5. The calibration system according to claim 1, wherein
- the control unit is embedded in the housing and comprises a microcontroller, an application-specific integrated circuit and/or an embedded computer, or
- the control unit is arranged externally to the housing and is connected to the housing via a power and/or communications cable and comprises a personal computer or an embedded computer.

6. The calibration system according to claim 1, wherein the aperture is covered by a diffuser.

7. The calibration system according to claim 1, wherein the optical sensor comprises further light sensitive components arranged to collect incident light and generate further channel signals indicative of the collected light, wherein
- the signal processing unit is arranged to read and process the further channel signals, the data processor is arranged to derive calibration data depending on the further channel signals, and
- the memory unit is arranged to store the calibration data from the further channel signals.

8. The calibration system according to claim 1, wherein
- the optical sensor comprises at least one light emitting device, and
- the signal processing unit is arranged to generate a feedback signal by means of the light emitting device and in response to the detection of the optical calibration pulse sequence.

9. The calibration system according to claim 1, wherein
- the memory unit comprise a non-volatile memory, wherein the non-volatile memory comprises an electrically erasable and/or one-time programmable memory; and
- the memory unit is an on-board memory or an off-board memory.

10. The calibration system according to claim 1, wherein the memory unit comprises a write once memory having an optical calibration fuse, wherein the optical calibration fuse is read from the memory unit by the signal processing unit and wherein the state of the optical calibration fuse is indicative of whether the calibration mode of operation has been initiated in the optical sensor arrangement.

11. The calibration system according to claim 1, wherein a calibration routine unit is connected to the signal processing unit and is arranged to execute a calibration routine once the calibration mode of operation has been initiated.

12. A method for in-situ assembly line calibration of the optical sensor arrangement embedded in the optical device using the calibration system according to claim 1, the method comprising:
- aligning the calibration arrangement with respect to the optical sensor arrangement,
- initiating the pre-calibration mode of operation of the optical sensor arrangement, wherein according to the pre-calibration mode of operation, the optical sensor arrangement is set to receive the optical calibration pulse sequence emitted by the at least one calibrated light source, upon receiving the optical calibration pulse sequence, operating the optical sensor arrangement to receive light from the at least one calibrated light source, to derive the calibration data from the received light and to store the calibration data in the memory unit of the optical sensor arrangement, and terminate the calibration mode of operation and enter a normal mode of operation.

13. The method according to claim 12, wherein the optical sensor arrangement comprises a light emitting device, and wherein the method comprises acknowledging that the optical calibration pulse sequence has been received by emitting a feedback signal using the light emitting device.

14. The method according to claim 12, wherein the calibration mode of operation is executed autonomously.

15. The method according to claim 12, wherein the calibration mode of operation comprises:

activating a first calibrated light source in the calibration head, recording light emitted from the activated light source by the optical sensor arrangement and generating the first channel signal indicative of the incident light, processing the first channel signal and derive the first calibration data for the first calibrated light source, storing the first calibration data, repeating the steps above by consecutively activating all of the calibrated light sources in the calibration head, and terminating the calibration mode of operation when the calibration data has been stored for all of the calibrated light sources embedded in the calibration head.

16. The method according to claim 15, wherein some or all of the steps executed during the calibration mode of operation are acknowledged to the optical sensor arrangement by emitting the optical calibration pulse sequence.

17. The method according to claim 15, wherein the calibration mode of operation is executed based on a predetermined time frame with no synchronization between the calibration head and the optical sensor arrangement.

* * * * *